United States Patent
Heim

(10) Patent No.: US 10,302,512 B2
(45) Date of Patent: May 28, 2019

(54) COMPONENT WITH AT LEAST ONE MEASURING ELEMENT COMPRISING A SENSOR

(71) Applicant: Schaeffler Technologies AG & Co. KG, Herzogenaurach (DE)

(72) Inventor: Jens Heim, Bergrheinfeld (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 29 days.

(21) Appl. No.: 15/123,799

(22) PCT Filed: Dec. 5, 2014

(86) PCT No.: PCT/DE2014/200680
§ 371 (c)(1),
(2) Date: Sep. 6, 2016

(87) PCT Pub. No.: WO2015/131862
PCT Pub. Date: Sep. 11, 2015

(65) Prior Publication Data
US 2017/0016786 A1    Jan. 19, 2017

(30) Foreign Application Priority Data

Mar. 5, 2014    (DE) .................. 10 2014 204 025

(51) Int. Cl.
| | | |
|---|---|---|
| G01L 5/00 | (2006.01) | |
| G01M 13/04 | (2019.01) | |
| F16C 19/52 | (2006.01) | |
| F16C 41/00 | (2006.01) | |
| F16C 33/58 | (2006.01) | |

(52) U.S. Cl.
CPC .......... *G01L 5/0019* (2013.01); *F16C 19/522* (2013.01); *F16C 33/586* (2013.01); *F16C 41/007* (2013.01); *G01L 5/0004* (2013.01); *G01M 13/04* (2013.01)

(58) Field of Classification Search
CPC .... F16C 19/522; G01L 5/0004; G01L 5/0009; G01L 5/0019; G01M 13/04
See application file for complete search history.

(56) References Cited

U.S. PATENT DOCUMENTS

| | | | |
|---|---|---|---|
| 4,341,122 A * | 7/1982 | Lechler | ................ G01L 5/0019 73/862.045 |
| 6,920,801 B2 | 7/2005 | Van Leeuwen et al. | |
| 2006/0107765 A1* | 5/2006 | Sentoku | ................ G01L 5/0009 73/862.322 |
| 2011/0255813 A1* | 10/2011 | Mol | ...................... F16C 19/522 384/448 |

(Continued)

FOREIGN PATENT DOCUMENTS

| | | |
|---|---|---|
| CN | 1488072 A | 4/2004 |
| CN | 202886033 U | 4/2013 |

(Continued)

*Primary Examiner* — Erika J Villaluna
(74) *Attorney, Agent, or Firm* — Volpe and Koenig, P.C.

(57) ABSTRACT

The invention relates to a component with a material recess and a measuring element comprising at least one sensor which is inserted with a positive fit in the material recess. This sensor is arranged in such a manner in or on the measuring element such that the measuring direction of the sensor essentially corresponds to the action line of the contact angle.

14 Claims, 7 Drawing Sheets

(56) References Cited

U.S. PATENT DOCUMENTS

2012/0126648 A1* 5/2012 Georgi .................... F16C 19/18
 310/90.5
2014/0157880 A1* 6/2014 Matsuda ............... F16C 41/008
 73/112.01

FOREIGN PATENT DOCUMENTS

| DE | 4225134 | 9/1993 |
| DE | 102011087471 | 6/2013 |
| EP | 0344496 | 12/1989 |

* cited by examiner

COMPONENT WITH AT LEAST ONE MEASURING ELEMENT COMPRISING A SENSOR

FIELD OF THE INVENTION

The invention relates to a component with a material recess and a measuring element that comprises at least one sensor and is fitted into the material recess with a positive fit.

BACKGROUND

For determining the loading of components during operation, forces and deformation acting on the component are measured. As sensors for detecting component loads, for example, load cells or strain gauges are used. Strain gauges are typically bonded directly onto the component to be measured. However, the mounting of such sensors in series production is complicated, because the strain gauges must be mounted individually on a surface with an adhesive and connected to wires individually.

In DE 10 2011 087 471 A1, a component with a sensor for measuring its load has already been proposed. This component has a material recess in which a measuring element that is designated there as a material element and has a sensor is fitted with a non-positive fit. The component whose loading is to be measured and is preassembled by producing the material recess can be, for example, a shaft, a bearing ring, or the like. In the scope of the production or assembly of the component, the preassembled measuring element having the sensor is then inserted into the recess so that the original state of the component is retained as much as possible.

However, it is desirable to further improve the signal quality of measurements. In particular, greater sensitivity, lower hysteresis, and better distinguishability of different load directions is desired.

SUMMARY

The invention is therefore based on the object of providing a component that enables a better differentiation between different load directions.

To achieve this objective, for a component of the type mentioned above, it is provided according to the invention that the sensor is arranged at or on the measuring element such that the measuring direction of the sensor essentially matches the line of action of the contact angle.

The invention is based on the knowledge that distinguishing between load directions is made easier if the sensor or its measuring direction is arranged in a certain way, namely such that the measuring direction of the sensor matches the line of action of the contact angle. Here it is sufficient if the measuring direction of the sensor approximately matches the line of action of the contact angle, especially if the contact angle is subject to changes as a function of external loads during operation.

The component according to the invention enables the positioning of at least one sensor directly in the path of forces with maximum loading. This path of forces with maximum loading corresponds to the line of action of the contact angle or the operating contact angle. This operating contact angle acts in a certain range around the structurally designed nominal contact angle due to the external loading of the component. Therefore, with knowledge of the contact angle or the operating contact angle, the invention makes it possible to determine the relationship between axial loading and radial loading. If the amount of loading is known, radial loads and axial loads can be determined separately by the measuring element and output in absolute magnitudes. Preferably the component closes the material recess flush at least on one side.

The component according to the invention can be a shaft or a bearing in which the exact determination of applied axial or radial loads must be monitored. The sensor of the component according to the invention can be an element of the following group that is sensitive to strain or pressure: strain gauge, thin film strain gauge, piezo element, piezo film, fiber Bragg grating, polymer optical fiber sensor, load cell.

One refinement of the invention provides that another sensor is arranged rotated by 90° relative to the first sensor on or in the measuring element of the component. In this construction, both sensors are located on the same plane, wherein the two sensors are arranged rotated by 90° relative to each other. Such an arrangement enables temperature compensation of a sensor, especially a strain gauge. Similarly, a measuring bridge comprising four sensors can be arranged on or in the measuring element of the component according to the invention. Such measuring bridges that are also called full bridges enable an especially exact detection of strain with reference to changes in resistance.

One especially preferred refinement of the component according to the invention provides that the at least one sensor is arranged at or on an inclined surface of the measuring element that is oriented relative to the line of action of the contact angle. Here it is especially preferred that the inclined surface is oriented parallel to the line of action of the contact angle or that the line of action of the contact angle runs along the inclined surface. In this way, an especially exact measurement of a strain along the line of action can be performed. By the use of the known elasticity modulus of the material of the measuring element, the applied force can be determined with reference to the detected strain. The measuring element typically consists of steel.

Other construction of the invention can provide that the measuring element is arranged in the component axially or radially or at an angle to the axial and/or radial direction. In this way, different possibilities are created that enable an adjustment of the arrangement of the measuring element or the sensor to different force directions. In this way, an optimum position of the measuring element can be determined for each application.

It is also in the scope of the invention that the sensor is arranged at or on the measuring element such that the measuring direction of the sensor essentially matches the line of action of the nominal contact angle or the operating contact angle.

In the component according to the invention it is also conceivable that the measuring element has multiple sensors arranged in parallel planes. In this way, the angle position of the line of action of the contact angle can be detected so that not only the magnitude of the component loading, but also its direction can be detected.

In this context it can be provided that a parallel plane has multiple sensors that are arranged rotated or orthogonal to each other. The arrangement of the sensors in a certain angle enables the detection of the direction of an applied external load.

One variant of the invention provides that the measuring element has a plane that is parallel to the axial direction and on which multiple sensors are arranged one next to the other. The sensors can be arranged on the plane one next to the other or one behind the other in the axial direction in order to detect measured values at different locations. The parallel plane can extend either over the entire length of a component that can be constructed, for example, as a shaft, or the parallel plane can also extend only over a section of its length. Obviously the sensors arranged on the parallel plane could be expanded by additional sensors, for example, by one or more sensors on the axial end face.

A similar variant provides that multiple sensors are arranged on an outer face of a cylindrical component. The multiple sensors can be oriented either one next to the other parallel to the periphery or they can also be arranged at an angle, that is, at an angle to the peripheral direction. In this way, sensors can make detections on the line of action of the contact angle of the component, in particular, of a bearing.

Finally, two or more sensors could also be arranged in planes that are rotated 90° relative to each other. In one plane there can be one sensor, two sensors, or multiple, for example, four sensors, in order to compensate for interference such as temperature influences.

All of the described arrangements could also be combined with each other in order to enable a differentiation between different load directions. Here, a weighing between the quality of the measuring signals and the manufacturing costs is required.

In the scope of the invention it can also be provided to compress or clamp sensors, in particular, strain sensors such as strain gauges, in an orthogonal orientation. In a component according to the invention, a measuring element with a plane parallel to the axial direction can be provided with orthogonally pressed sensors, wherein the measuring element is constructed in two parts and has a first part having the parallel plane and a second part that is complementary to the first part, wherein the sensors are arranged between the two parts. Here, different combinations of different measuring planes and sensors are also possible in order to enable the desired separation of force components.

The measuring element having the first and the second part can be divided in the middle along a plane of symmetry, so that the sensors are arranged in the middle. On the other hand, the measuring element can also be divided eccentrically so that one part is larger than the other part. In this construction, the sensors are loaded orthogonally not in the center.

Another construction of the invention provides that the component has an arrangement for tracking a measuring plane, wherein the arrangement is constructed so that the sensor is moved into the position of the maximum measuring signal. This automatically produced position is a measure for the contact angle produced during operation. The sensor can be moved in rotational or translational movements.

BRIEF DESCRIPTION OF THE DRAWINGS

An embodiment of the invention is shown in the drawing and is described in more detail below. Shown are.

DETAILED DESCRIPTION OF THE PREFERRED EMBODIMENTS

Figure 1:
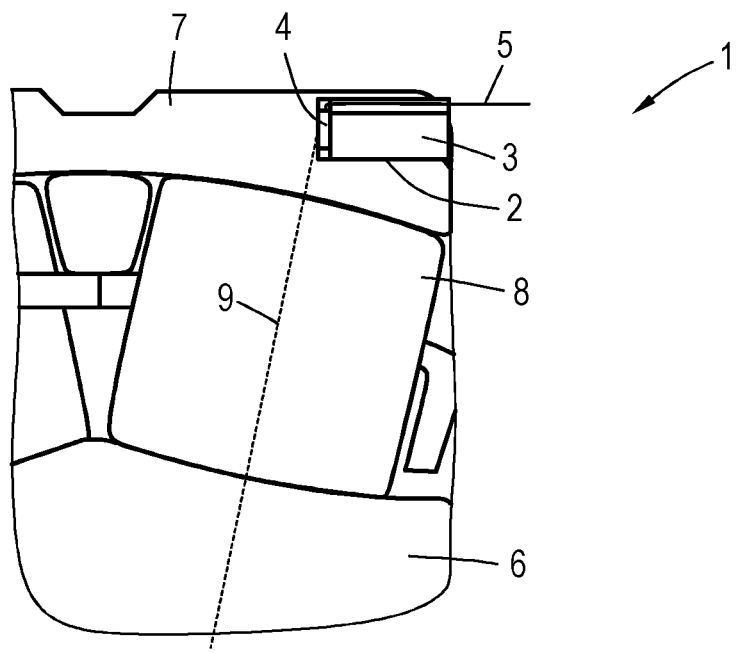
FIG. 1 a detail of a component according to the invention.

FIG. 1 shows a detail of a component 1 that is constructed as a roller bearing and has a cylindrical material recess 2 in which a measuring element 3 that has a sensor 4 is located. The sensor 4 is constructed as a strain gauge and has cables 5 that are connected to a measured value detection system.

The component 1 constructed as a roller bearing comprises an inner ring 6, an outer ring 7, and roller bodies 8 arranged in-between. In FIG. 1, it can be seen that the measuring element 3 has a cylindrical or pin-shaped construction. During the operation of the roller bearing, this is loaded by external forces. In FIG. 1, the line of action 9 of the nominal contact angle is shown with dashed lines. The sensor 4 is arranged on the measuring element 3 such that the measuring direction of the sensor essentially matches the line of action 9 of the contact angle. Accordingly, the sensor 4 is located directly in the flow of forces or at the position at which the flow of forces is a maximum.

It is possible to mount another sensor 4 rotated by 90° relative to the sensor 4 on the same surface of the measuring element 3, in order to enable temperature compensation. Likewise, four such sensors that are connected to form a measuring bridge (full bridge) can be arranged on the corresponding surface of the measuring element 3.

Figure 2:
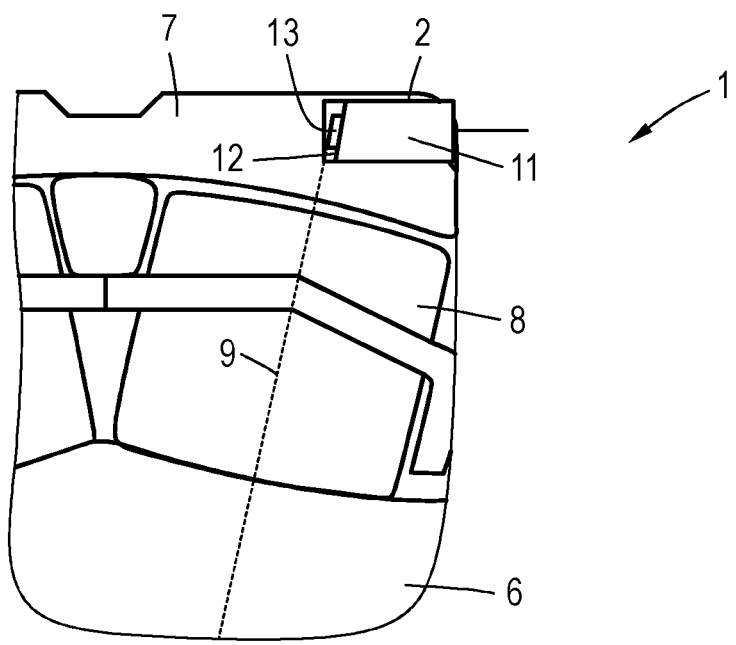
FIG. 2 a detail of another embodiment of a component according to the invention, FIG. 3 a detail of a component with a measuring element arranged in the radial direction, FIG. 4 a detail of another embodiment with a sensor arranged at an angle, FIG. 5 a similar view as FIG. 1 with drawn lines of action of the nominal contact angle and the operating contact angle, FIGS. 6-7 embodiments of cylindrical measuring elements, FIGS. 8-13 embodiments of cylindrical measuring elements in which sensors are arranged on an inner plane, FIGS. 14-17 embodiments of cylindrical measuring elements in which the sensors are pressed orthogonally between two parts of the measuring element, FIG. 18 an embodiment with a trackable measuring element, and FIG. 19 typical runs of sensor data, wherein the strain is recorded over the entire force.

FIG. 2 is a similar embodiment and shows a component 10 that is constructed as a roller bearing matching the first embodiment. Matching components are designated with the same reference symbols as in the first embodiment. The outer ring 7 has the material recess 2 in which the measuring element 11 is inserted. In contrast to the first embodiment, the measuring element 11 has an inclined surface 12 on which a sensor 13 is arranged. The sensor 13 formed as a strain gauge is thus arranged at an angle with respect to a radial plane of the component 10. The sensor 13 is arranged on the measuring element 11 so that the line of action 9 of the contact angle matches the position of the sensor 13. With the measuring arrangement shown in FIG. 2, a more exact measurement result can be obtained than with the measuring arrangement shown in FIG. 1.

Figure 3:
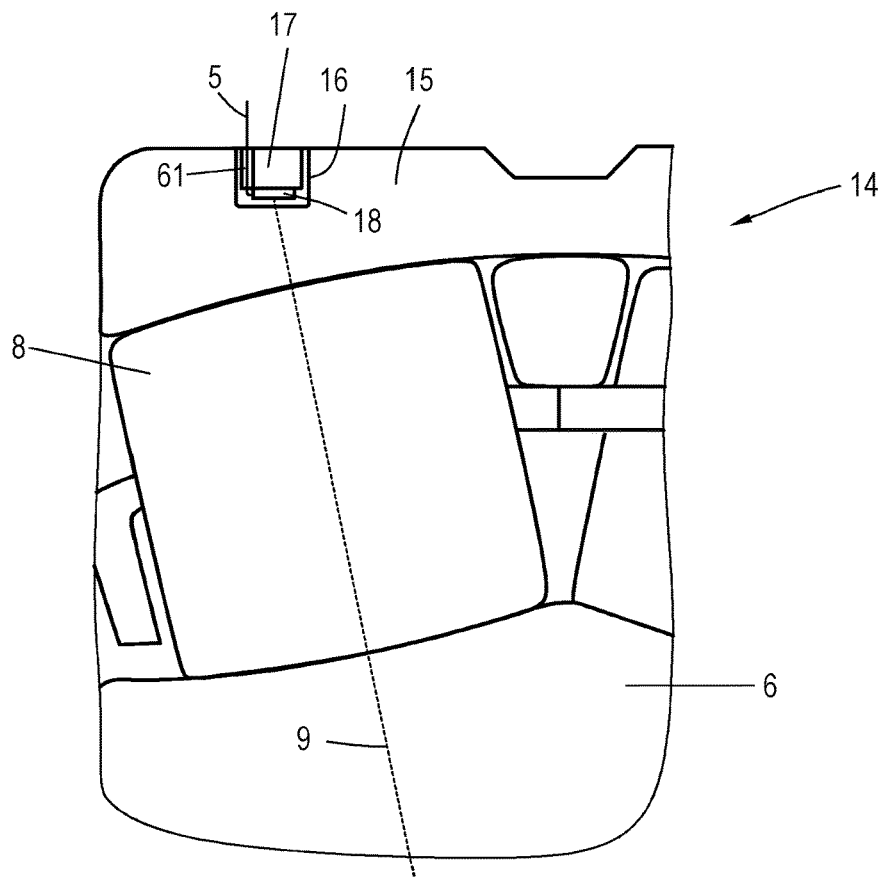

FIG. 3 is another embodiment and shows a component 14 that is constructed as a roller bearing and has an outer ring 15 provided with a material recess 16. The material recess 16 in which a measuring element 17 is inserted is positioned so that the line of action 9 of the nominal contact angle intersects a sensor 18 of the measuring element 17. For the component 14 constructed as a swivel-joint roller bearing, the measuring element 17 is thus inserted radially into the material recess 16 of the outer ring 15. The measuring element 17 has on one side a radial groove 61 that is used as a guide for the cable 5.

Figure 4:
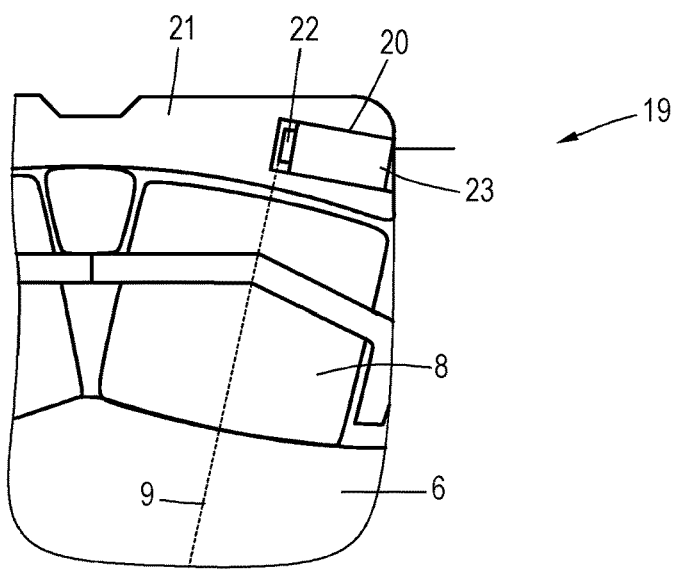

FIG. 4 shows another embodiment of a component 19 constructed as a roller bearing in which a material recess 20 is formed at an angle in the outer ring 21, so that the line of action 9 of the contact angle intersects the sensor 22 of the measuring element 23.

Figure 5:
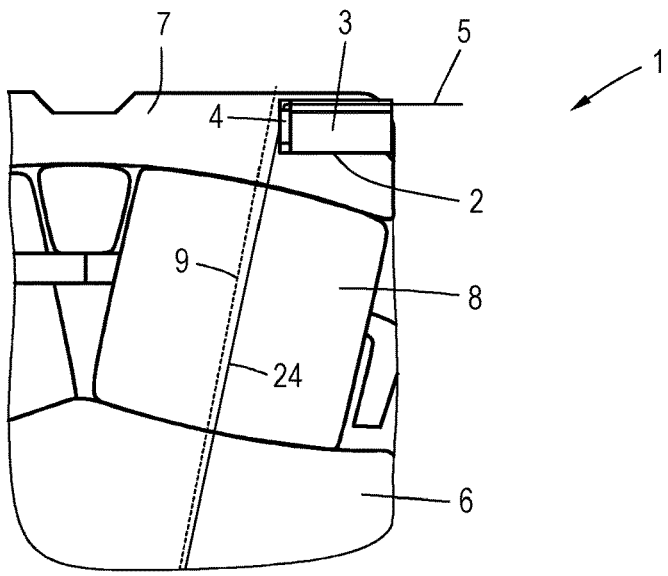

FIG. 5 is a similar embodiment as in FIG. 1; therefore, for matching components, the same reference symbols are used as in FIG. 1. The line of action of the nominal contact angle is designated with the reference symbol 9 and is shown with dashed lines. The line of action of the operating contact angle 24 is shown as a solid line. The sensor 4 can thus be positioned on the line of action 24 of the operating contact angle corresponding to a known relationship of axial load and radial load or according to an operating contact angle that is of particular interest for the evaluation. In FIG. 5 it can be seen that the line of action 9 of the nominal contact angle and the line of action 24 of the operating contact angle can differ from each other.

The measuring elements or measuring bolts can be basically inserted into the material recess in any direction, as shown, e.g., in the embodiments according to FIGS. 1 to 5.

Axial positioning, which is shown, for example, in FIGS. 1, 2, and 5, is preferred, because then the signal can be realized in an especially simple way by a cable feed or a mounted telemetry unit or by an electromagnetic or capacitive coupler.

The strain-measuring sensors can be mounted directly in the flow of forces between the component, in particular, between a roller element and a lateral surface of a bearing, without producing an interfering hollow space in the path of the flow of forces.

FIG. 4 shows such an example. It can be seen there that the flow of force line 9 runs directly through the area of the measuring element 23 that is provided with the sensor 22. The hollow space formed between the sensor 22 and the material recess is, in contrast, not in the flow of forces.

FIG. 3 similarly shows an embodiment with a radial measuring element 17 in which the flow of force line 9 runs through a hollow space that is formed between the inner end of the material recess 16 and the sensor 18. The measuring element 17 lies in the flow of force, although a smaller gap or intermediate space is present between the sensor 18 and the material recess 16.

Figure 6:
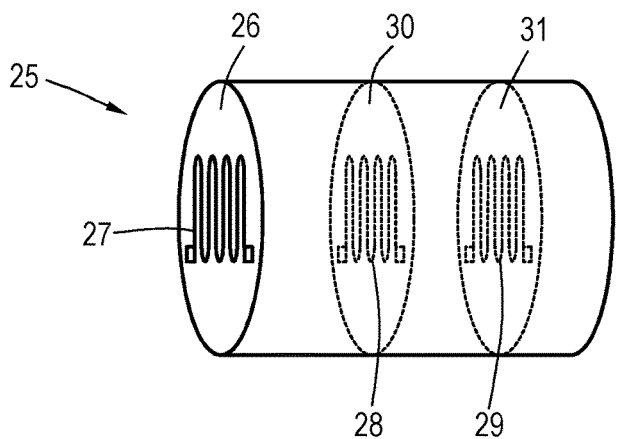

FIG. 6 is an embodiment of a measuring element 25 that is constructed as a cylindrical pin and basically matches the measuring element 3 of the preceding embodiments. A sensor 27 constructed as a strain gauge is mounted on an axial end face 26 of the measuring element 25. The measuring element 25 also has two additional sensors 28, 29 that are arranged in the interior of the measuring element 25 on planes 30, 31 that are parallel to the end face 26. All of the sensors 27, 28, 29 are connected to cables or lines that are not shown in FIG. 6 for reasons of better clarity. The strain-measuring sensors 27, 28, 29 arranged in multiple planes 26, 30, 31 parallel to each other are suitable for detecting the angle position of the line of action of the contact angle. Thus, not only the magnitude of the loads acting on the bearing, but also their direction, can be detected and distinguished. Optionally, the rear end face hidden in FIG. 6 can also have a sensor or multiple sensors.

Figure 7:
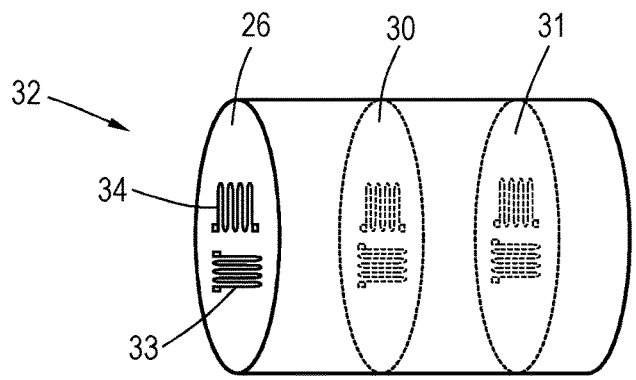

FIG. 7 is another embodiment of a measuring element 32 that has multiple planes 26, 30, 31 similar to the embodiment of FIG. 6, wherein sensors are arranged on the end face 26 and the inner parallel planes 30, 31 that are parallel to the end face 26. On each of the planes 26, 30, 31 there are two sensors 33, 34 formed as strain gauges, wherein the two sensors 33, 34 that are located in the same plane are arranged rotated by 90° relative to each other.

Figure 8:
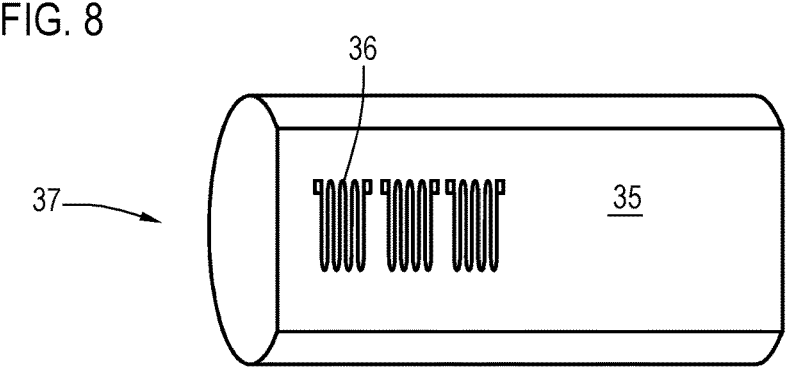

FIG. 8 is another embodiment of a measuring element 37 that has a plane 35 on which multiple sensors 36 are arranged one next to the other in the axial direction. The arrangement shown in FIG. 8 is suitable for detecting the angle position of the line of action of the contact angle, wherein not only the magnitude of the load of a component, for example, a roller bearing, can be detected and distinguished, but also its direction. In other constructions, the plane can also extend only over a part of the length of the measuring element.

Figure 9:
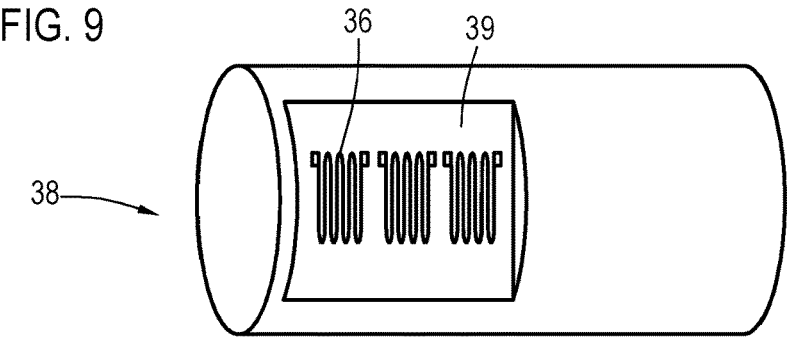

FIG. 9 is a similar view as FIG. 8 and shows a measuring element 38 in which a plane 39 on which the sensors 36 are arranged extends only over one section in the axial direction.

Figure 10:
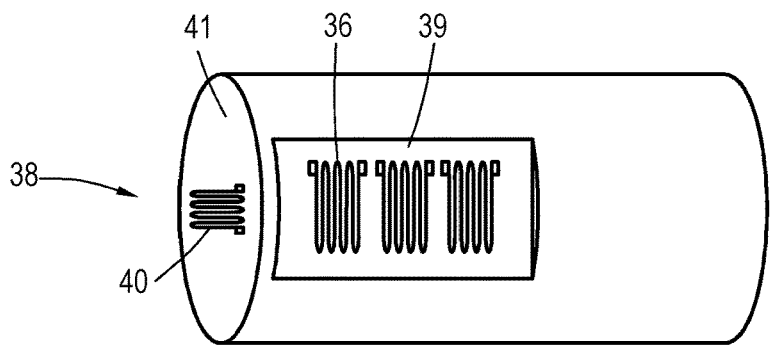

FIG. 10 similarly shows the measuring element 38 of FIG. 9 that also has, in addition to the sensors 36 on the plane 39, a sensor 40 on its axial end face 41.

Figure 11:
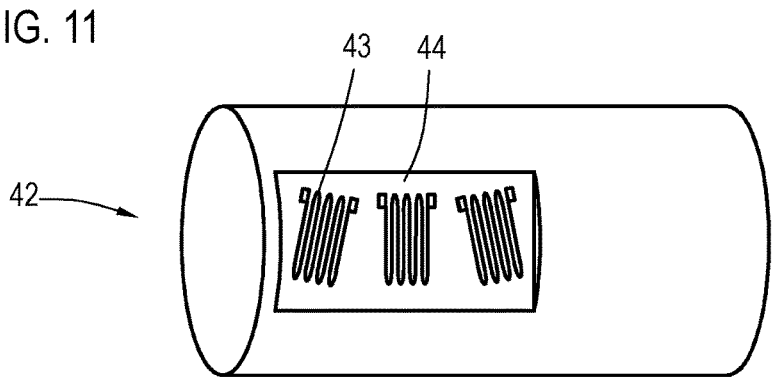

FIG. 11 shows a similar embodiment of a measuring element 42 in which the sensors 43 are arranged in the interior of the measuring element 42 on a plane 44. With reference to the middle sensor, the left sensor is arranged rotated in the clockwise direction and the right sensor is arranged rotated in the counterclockwise direction on the plane 44. In this way, the orientation and position of the sensors 43 can be adapted to the contact angle or a contact angle range. The sensors or an imaginary line of symmetry of the sensors 43 is adapted in the embodiment of FIG. 11 along different operating contact angles so that the lines of action of different operating contact angles each intersect a sensor 43.

Figure 12:
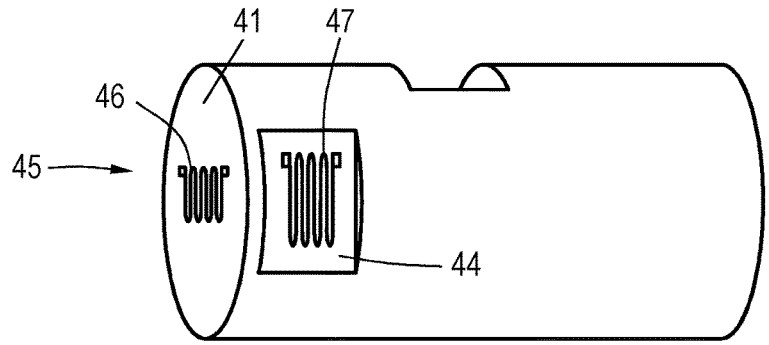

FIG. 12 is an embodiment of a measuring element 45 in which two sensors 46, 47 are arranged on two planes 41, 44 rotated by 90° relative to each other.

Figure 13:
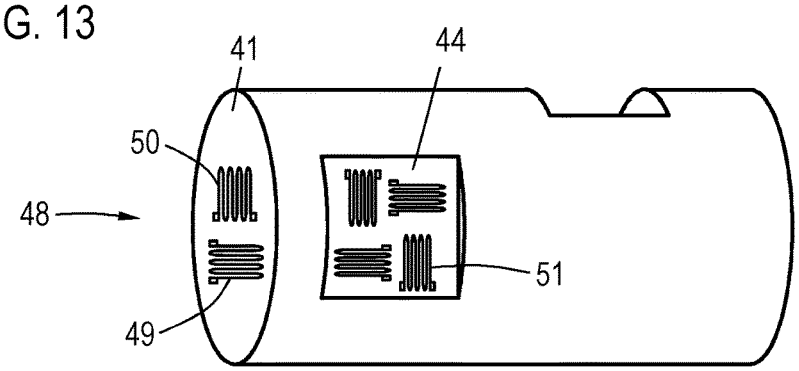

FIG. 13 is an embodiment of a measuring element 48 in which two sensors 49, 50 offset by 90° relative to each other are arranged on the end face 41. In addition, a total of four sensors 51 are arranged on the inner plane 44 in two rows and two columns, wherein adjacent sensors are offset by 90° relative to each other.

Depending on the wiring, interference such as temperature influences can be compensated or load direction can be distinguished with these sensors 51.

At this point it is explicitly noted that all of the preferred combinations of the previously described embodiments are to be viewed as essential to the invention.

Figure 14:
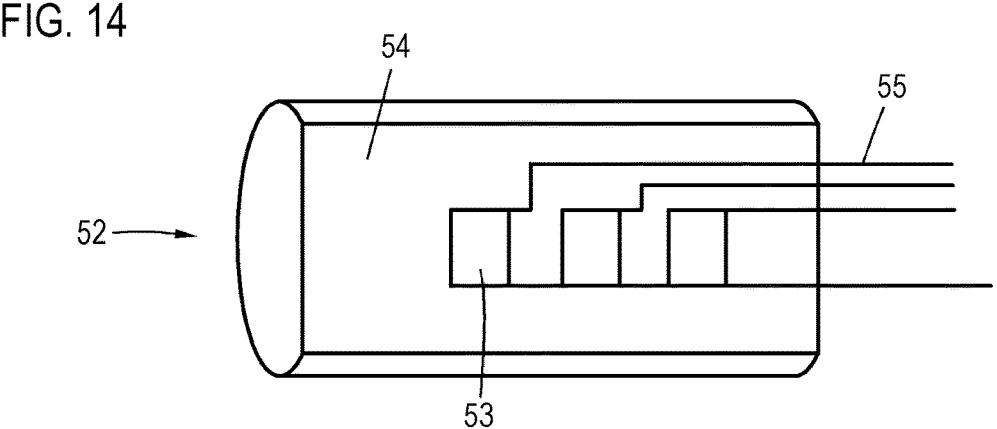

FIG. 14 is another embodiment of a measuring pin that has sensors 53 that are pressed in the orthogonal direction and are arranged on a plane 54 in the interior of the measuring element 52. Lines 55 for the measured value detection are allocated to the sensors 53.

Figure 15:
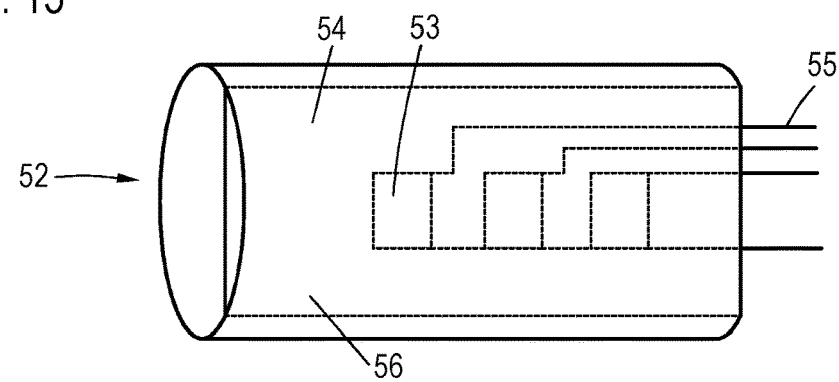

FIG. 15 is a similar view and shows the measuring element 52 that also has a second part 56 that is formed complementary to the first part shown in FIG. 14, so that the two parts together form the cylindrical measuring element 52. The sensors 53 are arranged on the partition plane 54 so that they are pressed or clamped between the two parts of the measuring element 52. In the measuring element 52, different measuring planes and measuring parts can be provided in order to enable a separate detection of strain and force components.

Figure 16:
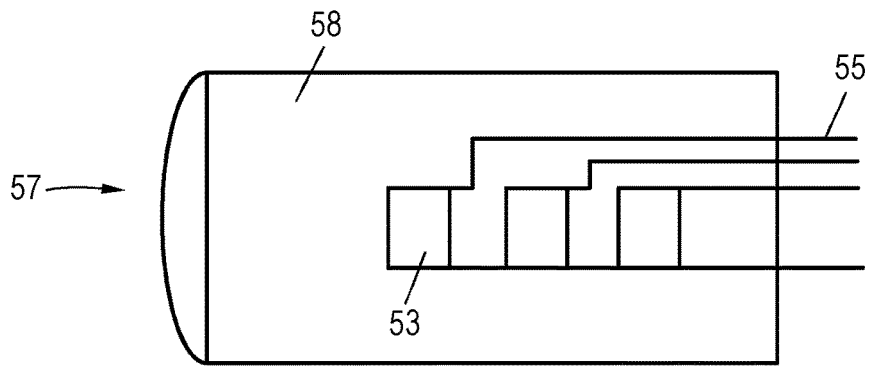

FIG. 16 is a similar view as FIG. 14 and shows a measuring element 57 in which a partition plane 58 runs through an imaginary center point. The second part of the measuring element 57 is thus constructed identical to the first part.

Figure 17:
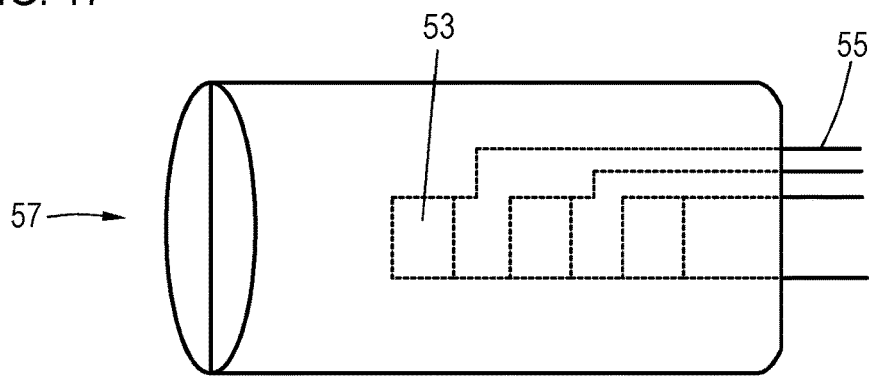

Analogous to FIG. 15, FIG. 17 shows the sensors 53 clamped between the two parts of the measuring element 57.

In the component that has one of the described measuring elements, the measuring plane, that is, the plane in which the at least one sensor, in particular, the strain gauge, is located, can be traced, in order to obtain information on the angle position of the operating contact angle. For this purpose, the sensor detecting the strain moves into the position in which the maximum measuring signal is detected. The applied position of the measuring element is a measure for the operating contact angle. The measuring element is coupled with an actuator that is constructed to rotate the measuring element about its longitudinal axis or to shift it along its longitudinal axis.

Figure 18:
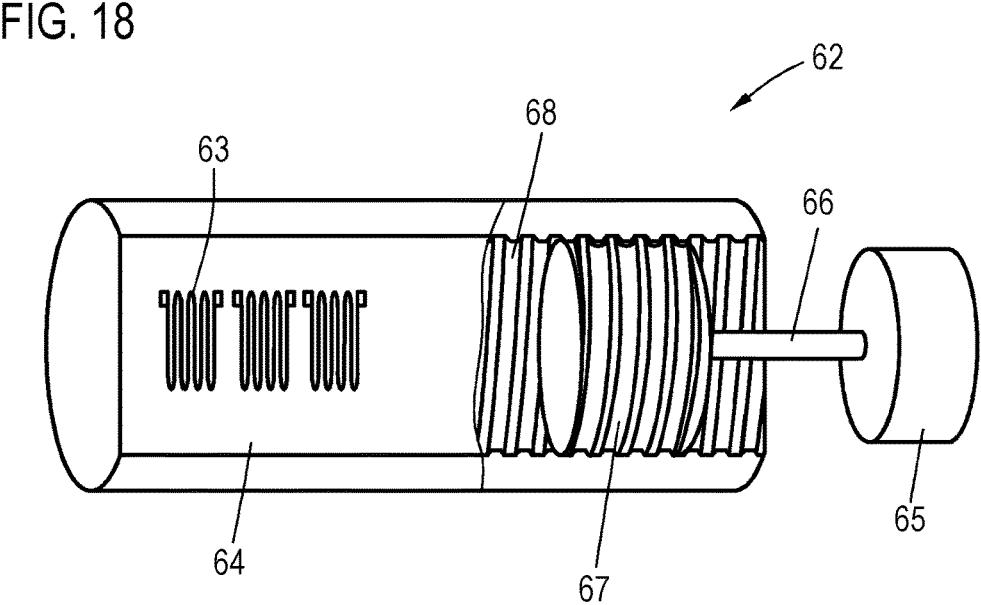

FIG. 18 shows a measuring element 62 with sensors 63 that are formed on a plane 64. An actuator 65 that is constructed as a drive and as an electric motor is connected to a spindle 67 by a shaft 66. The spindle 67 meshes with an internal thread 68 of the measuring element 62 adapted to it. By the use of a corresponding control system (not shown), the measuring element 62 is shifted by the drive 65 into the position in which the measuring signal supplied by the sensors 63 is at a maximum. The position of the measuring element 62 with reference to an output state is then a measure for the contact angle. The measuring element 62 can be shifted in the longitudinal direction. Other constructions are also conceivable in which the measuring element can be rotated about its longitudinal axis.

Figure 19:
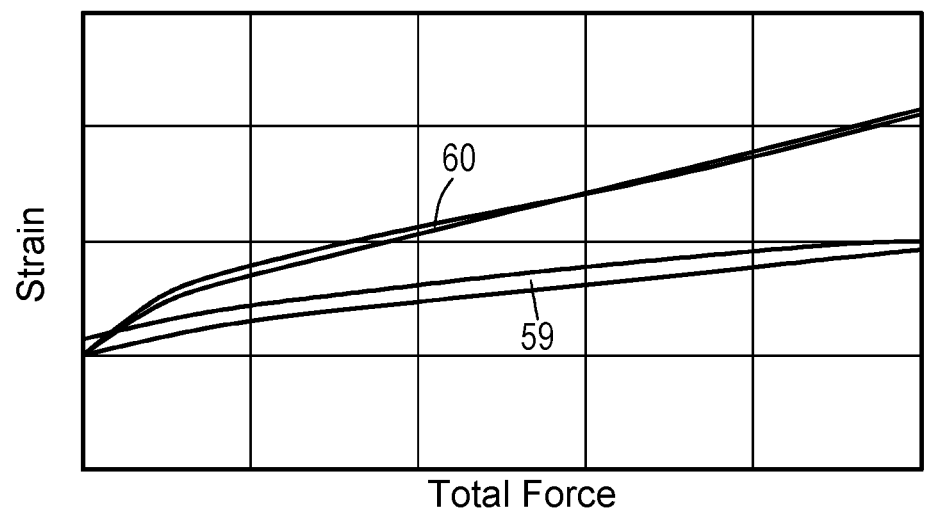

The measuring data detected by the sensors, in particular, by the strain sensors, are dependent on the bearing load and the position of the roller elements. Therefore, the measuring values are subject to an average value calculation, which can also be a sliding calculation, wherein the dependency of the measured values on the roller element position is eliminated. The window width of the average value calculation is selected so that it corresponds to the length of a signal period of a roller element passing the sensor. It has been proven that sensor data subject to an average value calculation exhibits a certain dependency on the global deformation of the bearing ring. This global deformation of the bearing ring is dependent on other boundary conditions, for example, how the bearing is installed and by which external forces the bearing was previously loaded. Therefore, the sensor signal exhibits a certain hysteresis, according to which, when a force is removed, the strain signal does not return completely to a starting value. To minimize these interfering influences, signal processing is selected in which an average value calculation is eliminated. Here, an evaluation of the signal stroke is preferred, because in this way the average value of the raw signal is eliminated. The signal stroke of multiple signal periods can then be subject, in turn, to an optionally sliding average value calculation, in order to equalize influences of non-round roller element raceways or unequal roller element diameters. In applications in which the bearing rotates quickly relative to a change in load, it is advantageous to select the window width of the average value calculation of the signal strokes as a whole-number multiple of the number of roller elements. The evaluation of the signal stroke supplies a higher sensitivity than the evaluation of the sensor data processed by the average value calculation, as shown in FIG. 19. On the horizontal axis, the total force is plotted. On the vertical axis, the strain is plotted. The reference symbol 59 designates sensor data that was obtained by an average value calculation. The reference symbol 60 designates sensor data that was obtained by the evaluation of the signal stroke. The evaluation of the signal stroke delivers greater sensitivity with reduced hysteresis. The average value calculation does not return completely to the starting point.

As aids for positioning a measuring element or measuring pin, a machine element can be used that has a stop for positioning with respect to the axial contact surface of a bearing ring. The rebound travel of the measuring element or the measuring pin can be provided by a suitable design of the stop. However, production-dependent tolerance effects in terms of the position of the strain-measuring sensor with respect to the contact angle of the component, in particular, the bearing, remain.

A reduction of the remaining tolerances can be achieved in which the measuring element is not arranged on the axial contact surface (end face), but instead an aid is inserted into the raceway of the bearing ring whose axial position is defined by the production contact angle of the bearing ring. The measuring element or measuring pin is then positioned on this aid.

Therefore, influences of rolling elements are not taken into consideration, because these are replaced by the aid. In order to eliminate or further minimize the remaining tolerance effects, strain is measured during the insertion process. Here, the bearing or the bearing ring is loaded by the rolling elements or by substitute rolling elements. The loading of the bearing can also be realized such that an operating contact angle is produced that passes laterally through the planned sensor position. It is also advantageous that the measuring pin or the measuring element is inserted until the measured strain of a previously selected measuring position has exceeded a maximum value.

LIST OF REFERENCE NUMBERS

1 Component
2 Material recess
3 Measuring element
4 Sensor
5 Cable
6 Inner ring
7 Outer ring
8 Roller element
9 Line of action
10 Component
11 Measuring element
12 Surface
13 Sensor
14 Component
15 Outer ring
16 Measuring recess
17 Measuring element
18 Sensor
19 Component
20 Material recess
21 Outer ring
22 Sensor
23 Measuring element
24 Line of action
25 Measuring element
26 End face
27 Sensor
28 Sensor
29 Sensor
30 Plane
31 Plane
32 Measuring element
33 Sensor
34 Sensor
35 Plane
36 Sensor
37 Measuring element
38 Measuring element
39 Plane
40 Sensor
41 End face 42 Measuring element
43 Sensor
44 Plane
45 Measuring element
46 Sensor
47 Sensor
48 Measuring element
49 Sensor
50 Sensor
51 Sensor
52 Sensor
53 Sensor
54 Partition plane
55 Line
56 Part
57 Measuring element
58 Partition plane
59 Reference symbol
60 Reference symbol
61 Groove
62 Measuring element
63 Sensor
64 Plane
65 Drive
66 Shaft
67 Spindle
68 Internal thread

The invention claimed is:

1. A bearing arrangement including a first bearing ring, a second bearing ring, and rolling elements arranged therebetween, at least one of the first bearing ring or the second bearing ring including a material recess and a measuring element that comprises at least one sensor and is fitted into the material recess with a positive fit,
the material recess is formed as an axial bore extending from an axial end face of the at least one of the first bearing ring or the second bearing ring,
the measuring element is pin-shaped,
the at least one sensor is arranged at or on the measuring element such that a measuring direction of the sensor matches a line of action of a contact angle of the bearing arrangement, and
the line of action is angled relative to a radial direction of the bearing arrangement.

2. The bearing arrangement according to claim 1, wherein the at least one sensor is arranged at or on an inclined surface of the measuring element that is oriented toward the line of action of the contact angle.

3. The bearing arrangement according to claim 1, wherein the at least one sensor is arranged at or on the measuring element such that the measuring direction of the sensor matches the line of action of a nominal contact angle or an operating contact angle.

4. The bearing arrangement according to claim 1, wherein the measuring element has multiple ones of the sensors arranged in parallel planes.

5. The bearing arrangement according to claim 4, wherein one of the parallel planes has multiple ones of the sensors that are arranged rotated or orthogonal to each other.

6. The bearing arrangement according to claim 1, wherein the measuring element has a plane on which multiple ones of the sensors are arranged one next to the other.

7. The bearing arrangement according to claim 1, wherein the measuring element is provided with a plane parallel to an axial direction with orthogonally printed sensors, the measuring element is formed in two parts and has a first part with the parallel plane and a second part complementary to said first part, and the sensors are arranged between the two parts.

8. The bearing arrangement according to claim 1, further comprising an arrangement for tracking a measuring plane of the sensor, and the arrangement is constructed to move the sensor into a position of a maximum measuring signal.

9. The bearing arrangement according to claim 1, wherein the line of action of the contact angle of the bearing arrangement corresponds to a path of force of maximum loading of the bearing arrangement.

10. The bearing arrangement according to claim 1, wherein the rolling elements are cylindrical pin rollers.

11. The bearing arrangement according to claim 1, wherein the bearing arrangement is an angular contact bearing arrangement.

12. A bearing arrangement including a first bearing ring, a second bearing ring, and rolling elements arranged therebetween, at least one of the first bearing ring or the second bearing ring including a material recess and a measuring element that comprises at least one sensor and is fitted into the material recess with a positive fit,
the measuring element is pin-shaped,
the at least one sensor is arranged at or on the measuring element such that a measuring direction of the sensor matches a line of action of a contact angle of the bearing arrangement,
wherein the material recess is formed as an axial bore extending from an axial end face of the at least one of the first bearing ring or the second bearing ring.

13. The bearing arrangement according to claim 12, wherein the rolling elements are cylindrical pin rollers.

14. The bearing arrangement according to claim 12, wherein the bearing arrangement is an angular contact bearing arrangement.

* * * * *